United States Patent [19]
Gottzein et al.

[11] 3,804,024
[45] Apr. 16, 1974

[54] METHOD AND APPARATUS FOR THE DYNAMIC UNCOUPLING OF A RAIL-GUIDED VEHICLE FROM ITS GUIDING RAIL MEANS

[75] Inventors: Eveline Gottzein, Oberpframmern; Norbert Klamka, Heufeld, both of Germany

[73] Assignee: Messerschmitt-Bolkow-Blohm GmbH, Munich, Germany

[22] Filed: May 3, 1972

[21] Appl. No.: 250,022

[30] Foreign Application Priority Data
June 1, 1971 Germany.................. P 21 27 047.3

[52] U.S. Cl.......................................... 104/148 MS
[51] Int. Cl.......................................... B61b 13/08
[58] Field of Search................. 104/148 MS; 308/10

[56] References Cited
UNITED STATES PATENTS
3,638,093  1/1972  Ross............................ 104/148 MS

*Primary Examiner*—Robert J. Spar
*Assistant Examiner*—George H. Libman
*Attorney, Agent, or Firm*—McGlew & Tuttle

[57] ABSTRACT

The dynamic uncoupling is effected by means of control circuits including measuring elements determining the instantaneously detectable distance between the guide means of the vehicle and its guiding rail means, and also determining the vertical and horizontal accelerations of the vehicle relative to the guiding rail means. The acceleration signals are supplied to a control circuit to form a directrix for the vehicle travel path, and the distance determination signals are superposed on the acceleration signals in the control circuit to cause the directrix to maintain a preselected mean position relative to the guiding rail means. The directrix is utilized to supply signals, through another control circuit, to the vehicle guide means to maintain the center of gravity of the vehicle at a constant distance from the directrix. A regulator cascade of three self-contained control circuits is utilized in combination with a coupling matrix to control the energization of guiding magnets operatively associated with the guide rail means. Additional parameters, representing desired travel values and the like for the vehicle, are supplied to the regulator cascade through a trimming regulator.

12 Claims, 4 Drawing Figures

METHOD AND APPARATUS FOR THE DYNAMIC UNCOUPLING OF A RAIL-GUIDED VEHICLE FROM ITS GUIDING RAIL MEANS

FIELD AND BACKGROUND OF THE INVENTION

This invention relates to a method of and apparatus for the dynamic uncoupling of a rail-guided vehicle from its guide rail means.

The traveling behavior and the traveling speed of a vehicle constrained by engagement between its running gear and rails is determined to a great extent by the properties of the roadbed, including the foundation and the rails, along which the vehicle is guided. The evenness of the rails is determinant, for example, for the expenditures required, on the vehicle, for the wheel suspensions and the spring system, as well as for the oscillations of the body of the vehicle. As is known, any unevenness of the rails or the roadbed causes vertical movement of the wheels relative to the body of the vehicle, while unevenness distributed at equal intervals along the path of travel causes periodic oscillatios of the vehicle body.

In addition, the foundation or roadbed carrying the rails must absorb all forces produced when the vehicle runs over the rails, but it still must not be dynamically rigid. A rigid roadbed would result in intolerable stresses on the vehicle and the rails, as well as on the users of the vehicle, since the vehicle follows substantially all variations of the roadbed. For this reason, the roadbed is made elastic, so that the vehicle guided along the roadbed can properly compress the rails. By so doing, the wear and the costs can be kept within tolerable limits, and a certain riding combort can be provided for the passengers. However, this is possible only at the expense of a considerable limitation of the traveling speed, as well as requiring constant supervision and maintainance of the roadbed.

The same considerations hold true for vehicles maintained dynamically on a guide rail, such as so-called monorail conveyors which, when deflected from a nominal position, are moved back automatically, or by specially produced restoring forces, into the nominal position. Since, in this case, the roadbed must be rigid, the vehicle follows all unevenness of the roadbed, and the resulting accelerations limit not only the traveling speed of these vehicles but also require a large amount of energy for their formation and elimination. In addition, considerable expenditures are required for the spring system of the vehicle body relative to its traveling gear, so as not to subject the passengers to intolerable accelerations.

Both types of vehicles have, in common, that the guiding forces, and thus the horizontal transverse forces exerted in the directions of the axes of rotations of the wheels, increase very rapidly with an increase of the traveling speed, resulting in intolerable wear on the wheel flanges around the guide means, as well as on the rail heads.

In order to reduce the wear, it is known to produce an air cushion between the guide rail means and the vehicle, with the vehicle being able to glide on this air cushion. The production of an air cushion which can support the vehicle in all operating conditions requires an unusually high expenditure of energy for the above-mentioned reasons, apart from the fact that a great deal of energy is required, in any event, to produce the air cushion.

There are also known wheel-less vehicles which are guided along iron rails and guide rails, in suspended position, by means of magnetic fields, and where the magnetic fields are regulated by distance control elements which measure the respective gaps between supporting magnets and guide magnets and the respective rails, and which are so connected into electrical circuits that the magnetic forces balance the gravitational force when the supporting magnets and the guide-magnets have a preselected distance from the associated rails.

Above and below this distance, the exciter currents are increased or decreased so that equilibrium is maintained. Since the suspended vehicle follows all changes of the roadbed, so that it must be constantly accelerated and decelerated, oscillations of the control systems are unavoidable, in addition to which very high currents are required.

SUMMARY OF THE INVENTION

The problem to which the present invention is directed is to provide a method and apparatus by means of which rail-guided vehicles can be uncoupled dynamically from their guide means, such as rails, for example, to increase both the traveling speed of the vehicle and, at the same time, to reduce the wear between the supporting and guide means, and which permit the use of dynamically rigid roadbeds.

In accordance with the present invention, this problem is solved in that a directrix is formed in dependence on the instantaneous lateral and vertical accelerations of the vehicle and the instantaneously detectable distance (actual value) between the guide means of the vehicle and its supporting means (rails), which directrix is superimposed, as a nominal value, on at least one control circuit which maintains the distance of the center of gravity of the vehicle from the directrix at a constant value.

The invention can be used with particular advantage when the distance between the magnets, of a magnetic suspension rail vehicle, and the supporting and guiding rails must be regulated. In this case, a directrix is formed in accordance with the invention in dependence on the instantaneous vertical and lateral accelerations of the vehicle, and of the instantaneously detectable distances between the supporting magnets and lateral guide magnets from their respective rails. This directrix is superimposed as a nominal value on the vertical and lateral control circuit for the supporting and guide magnets of the magnetically suspended vehicle.

If the production of the forces holding the car body on the directrix, in vehicles guided along a travel path by interaction between the traveling gear and guide rail means, requires additional means, these are already provided in magnetically suspended vehicles. In such vehicles, called suspended vehicles, the vehicle is held and guided, as known, by means of magnetic forces acting on supporting rails and guide rails, and a control circuit, for regulating the currents exciting the supporting magnets and the guide magents, is provided. These currents must be so regulated, in dependence on the distance of the supporting and guide magnets from the associated supporting and guide rails, that an air gap is always maintained between the rails and the magnets, and must not increase above or decrease below certain limits. If the suspended vehicle follows, in presently known regulating methods, all changes of the roadbed, it is assured, in the method embodying the invention, that the center of gravity of the suspended vehicle follows the respective directrix, and hence is independent of the changes of the roadbed, to a great extent. Independent of disturbing forces and irregularities of the roadbed, only minor acceleration peaks appear in the suspended vehicle, due to the respective directrix formed in accordance with the invention.

This directrix is formed by linking acceleration signals and distance-measuring signals, or by the distance-measuring signals with additional supporting values.

For the formation of the directrix signals to be fed to the control circuit, there are determined differences between the respective mean values of the preferably twice-integrated acceleration measuring signals and the respective mean values of the gap or distance measurements (actual value), which are supplied to the respective magnetic current setting means, after the superimposition of additional control parameters through a regulator to which a means gap width is fed as an additional nominal value.

The movement of the center of gravity of the suspended vehicle thus serves as an actual value for this regulation, while a means gap width, that is, a mean center of gravity position of the suspended vehicle relative to the rail plane, serves as a nominal value, and is kept constant through supporting circuits.

For guiding a suspended vehicle along its supporting and guide rails, there is provided a regulator cascade consisting of three self-contained control circuits, and whose inner control circuit comprises a main regulator, a coupling matrix combining the signals of the supporting and guide control circuits, magnetic current setting means, and supporting and guiding magnets, as well as pickups. This is suborinated to a trimming regulator, and a third regulator superimposes a traveling control circuit. Each supporting circuit has an accelerometer and a gap measuring instrument, and the supporting circuits constitute regulators looped with each other through summation elements, behind which is arranged an additional regulator, for the introduction of additional control parameters. and whose output is supplied, through an additional summation element, to the vertical and lateral regulator of the control system.

Instead of regulating the exciter currents of magnetic current setting means, it is naturally also possible, using this arrangement, to regulate the throughput of an air cushion-supported suspended vehicle.

In accordance with another feature of the invention, the control circuits have digital computer units as control devices which are supplied both from storages, containing supporting values, and from pickups. As supporting values, there may serve, for example, traveling programs containing accerations, decelerations, curves, slopes, gradients, etc., track signals, and so-called track identification signals, which are supplied by pickups installed along the track and introduced into the storage units of the suspended vehicle utilizing the track. However, supporting values also can be determined by a measuring train, which inspects the track at predetermined times, and supplied into the pickups installed in the particular track section. Thus, it is also possible to determine displacements of the rail course, which require adjustment of the supporting and guide magnets, relative to the suspended vehicle, in due time, so that the prescribed gap width is not exceeded. The travel program preferably is stored in long-term storages of the suspended vehicle.

Thus, variations of the gaps between the supporting and guiding magnets and their associated supporting and guiding rails remain small in curves and slopes. Since there are no great fluctuations, the voltage increases required for regulating the currents exciting the supporting and guide magnets remain small.

In accordance with another feature of the invention, the supporting and guide magnets are connected with the suspended vehicle through spring means whose spring characteristic is so selected that long-wave disturbance variables are blocked. Long-wave disturbances of the roadbed thus are intercepted in a manner such that the supporting and guide magnets are connected with the suspended vehicle not rigidly but through parts having a spring characteristic. Both the individual magnets and the magnet groups can be connected elastically with the suspended vehicle.

In this way, long-wave disturbances, appearing with a large amplitude, are regulated through the spring characteristics, with short-wave disturbances, appearing with a small amplitude, being regulated through the magnet control circuits of the supporting and guiding systems. This has the advantage that the disturbances appearing in the given frequency band can be processed separately with respect to their frequencies, rapid disturbances being regulated by the main control circuits, medium speed disturbances being regulated by the supporting circuits, and slow disturbances being regulated through the spring system, which may be designed as an active system or a passive system. With an active design of the spring system, the latter is designed per se, according to another feature of the invention, as a control circuit which is also looped with the above-mentioned control and supporting circuits.

In addition to the adaptation of the control circuits to the band width of the disturbances, an essential advantage of the arrangement embodying the invention is that energetically unfavorable gap widths between the supporting and guide magnets and the respective rails are avoided.

As described above, the method of the invention permits optimum dynamic uncoupling between a roadbed and a suspended vehicle so that, for the first time, an economical operation of these vehicles is possible, independent of their length.

An object of the invention is to provide an improved method for the dynamic uncoupling of a rail-guided vehicle from its guided rail means.

Another object of the invention is to provide an improved apparatus for performing the method.

A further object of the invention is to provide such a method and apparatus which permit optimum dynamic uncoupling between the roadbed and a suspended vehicle so that an economical operation of the vehicle is possible independent of its length.

For an understanding of the principles of the invention, reference is made to the following description of a typical embodiment thereof as illustrated in the accompanying drawings.

DESCRIPTION OF THE PREFERRED EMBODIMENT

Figure 1A:
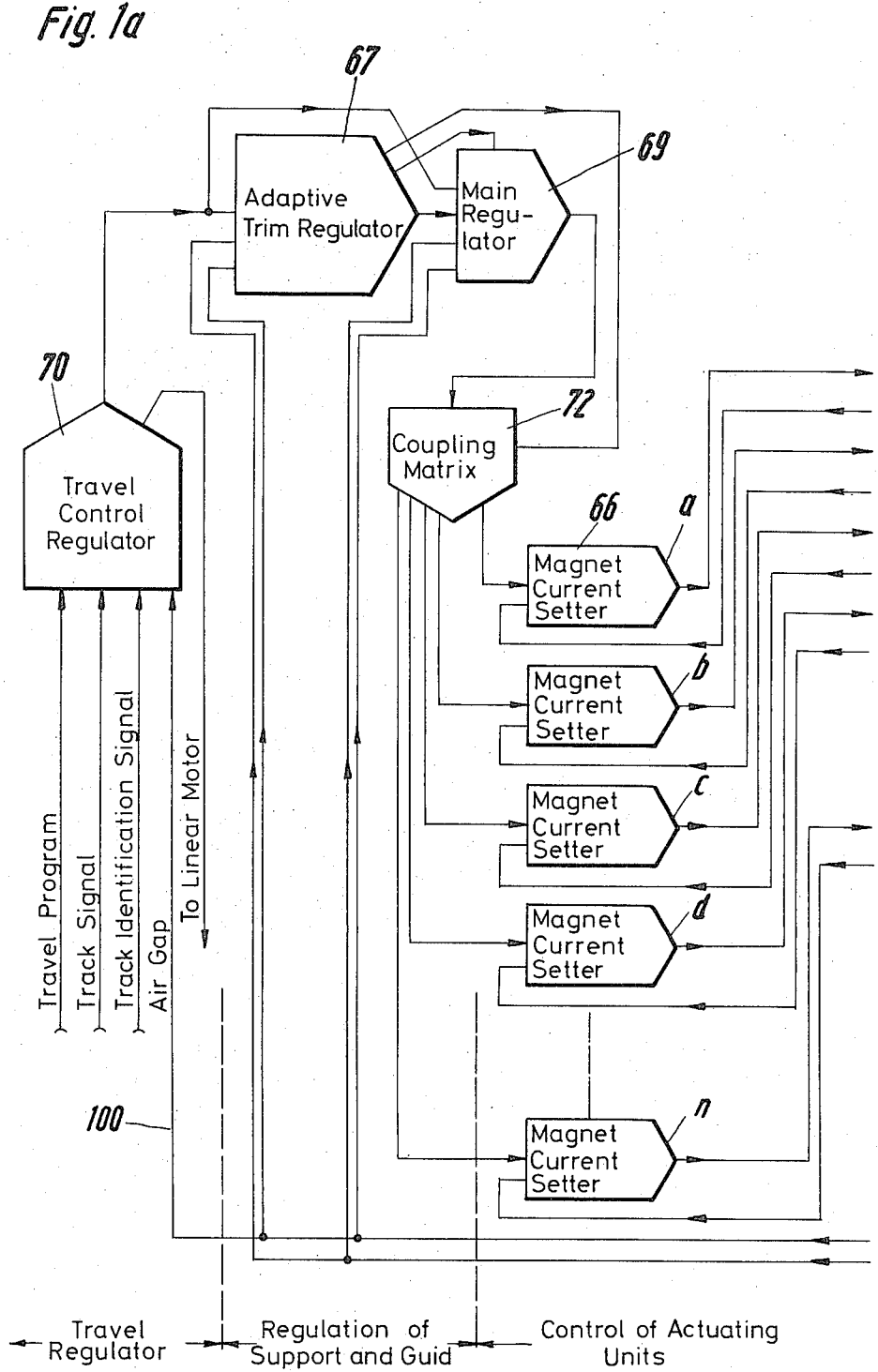
FIGS. 1a and 1b conjointly constitute a block circuit diagram of a control system for the magnetic support and guidance of suspended vehicles.
Figure 1B:
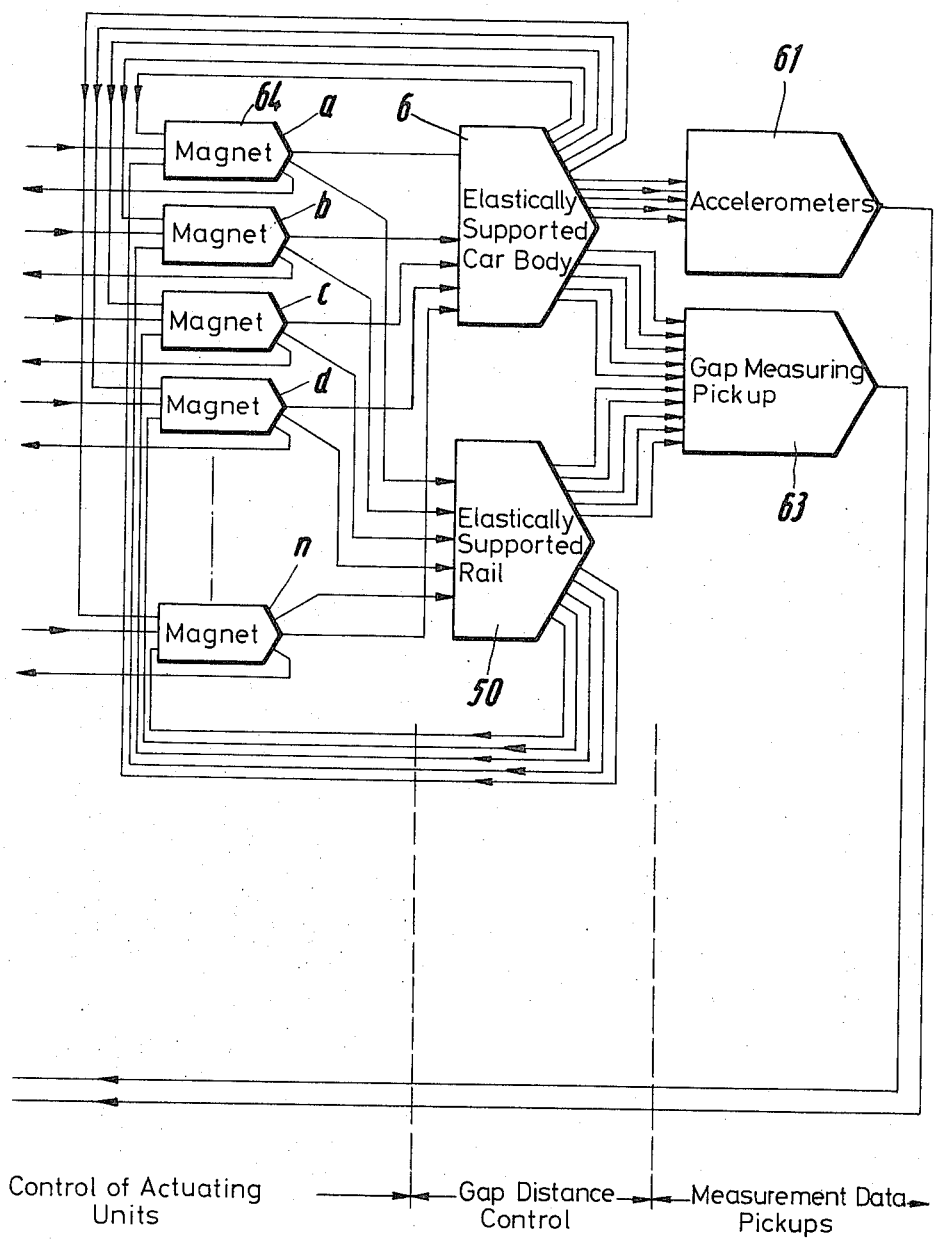
Figure 3:
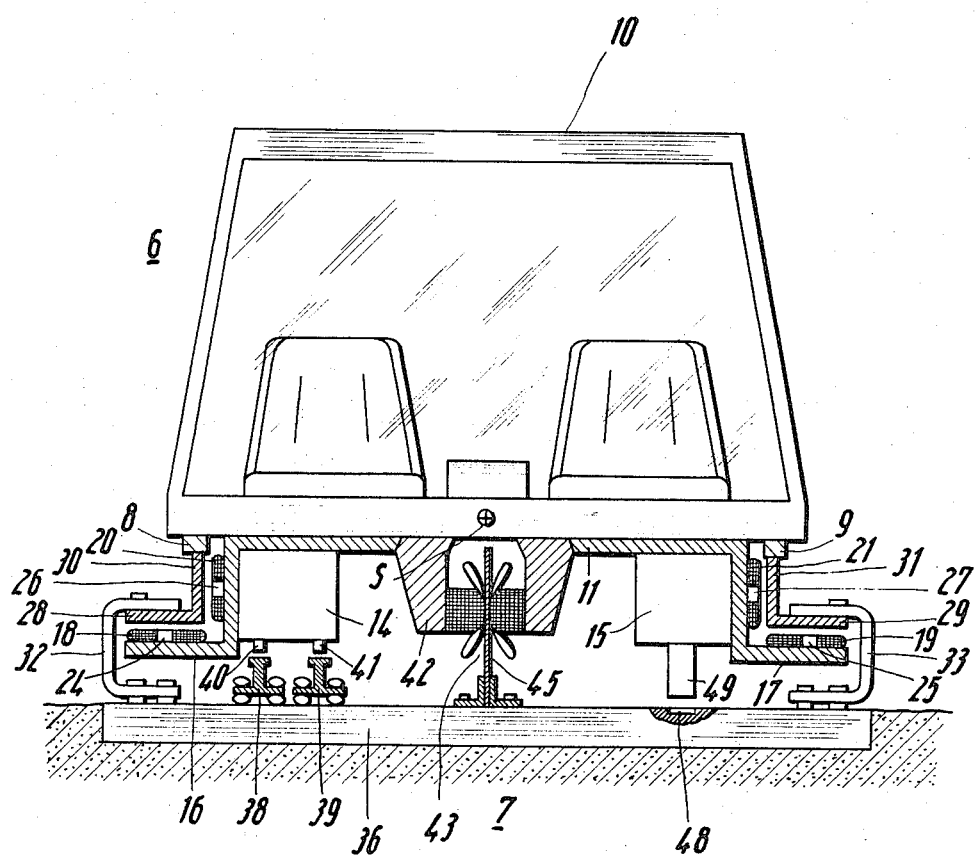
FIG. 3 is a front elevation view, partly in section, of a suspended vehicle.

Referring first to FIG. 3, a schematically illustrated suspended vehicle 6 is guided by means of a control system, shown in FIGS. 1a and 1b, along a roadbed 7 which is also schematically illustrated. Vehicle 6 comprises a car body 10 and a suspension frame 11, and the connection between the car or vehicle body and its suspension frame 11 can be either rigid or elastic.

Suspension frame 11 consists substantially of two torsion-resistant bodies 14 and 15 which are rigidly connected with each other by crossbeams, which have not been shown. In the bodies 14 and 15, there are arranged the individual units (not shown in FIG. 3) of the control system represented in FIGS. 1a and 1b. The torsion-resistant bodies also carry, on their outer sides, respective angle rails 16 and 17 on which are secured supporting magnets 18, 19 and guiding magnets 20, 21, respectively. These magnets are combined into magnet groups 64 (see FIG. 1b) which are connected either rigidly or elastically with the angle rails.

On the angle rails 16 and 17, there are also arranged respective gap-measuring instruments 24, 25 and 26, 27, which have the function of determining the air gap between the supporting and guiding magnets and the supporting rails 28, 29 and guiding rails 30, 31, respectively. Adjacent the center of gravity S of the vehicle, there are also arranged accelerometers, which have not been shown in FIG. 3, but which are indicated at 61 in FIGS. 1b and 2.

The supporting and guiding rails, designed as angle rails in the illustrated embodiment, are rigidly connected with the ties 36 of the roadbed 7 through respective stirrups 32 and 33. In the rest position, the suspended vehicle bears, through sliding blocks 8 and 9, on the respective supporting rails. There are also secured, on tie 36, insulated current conductor bars or rails 38 and 39 from which electric power, for example in the form of three-phase current, is supplied through current collectors 40 and 41 to the control system and to the driving system, described hereinafter.

The driving system consists of a double-sided asynchronous linear motor 42, shown only schematically, having an air gap 43 into which there extends a reaction bar 45 which is also secured on ties 36. The roadbed additionally carries pickups 48, designed as storages, which cooperate with scanning means 49 of suspension frame 11.

The control system for supporting and guiding the suspended vehicle, as represented in FIGS. 1a and 1b, comprises the vehicle 6 and a controlled system including rails 50 representing the roadbed and rail properties. Additionally, the control system includes pickups 61, designed preferably as accelerometers, for the directrix serving as a reference travel path, and pickups 63 for the rails, which comprise the gap-measuring means 24 – 27. Additionally, the control system includes setting means to which are assigned the supporting and guide magnets 18 – 21, and the magnetic current setting means 66a – 66n, combined into magnet groups 64a – 64n. Additional components of the control system include the regulators proper of the supporting and guide system, consisting of an adaptive trimming regulator 67, for introducing a gap width to be maintained, for the adaptation of the regulation to varying vehicle parameters, which vary in dependence on the load of the vehicle, on the external forces acting on the suspended vehicle and on the traveling speed, the main regulator 69, shown in detail in FIG. 2, and the superordinated travel regulator 70 to which are fed, as nominal values, traveling program signals, track signals and track identification signals.

As can be seen from FIGS. 1a and 1b, the control system consists of three self-contained control circuits, namely, an inner control circuit, consisting of main regulator 69, a coupling matrix 72 combining the signals of the supporting and guiding control circuits, magnetic current setting means 66, magnet groups 64 and pickups 61 and 63, a trimming control circuit, consisting of adaptive trimming regulator 67 to which the main regulator, to be described below, is subordinated, and the superordinated travel control circuit 70 through which the suspended vehicle is operated and over which the linear motor 42 is thus also controlled.

Figure 2:
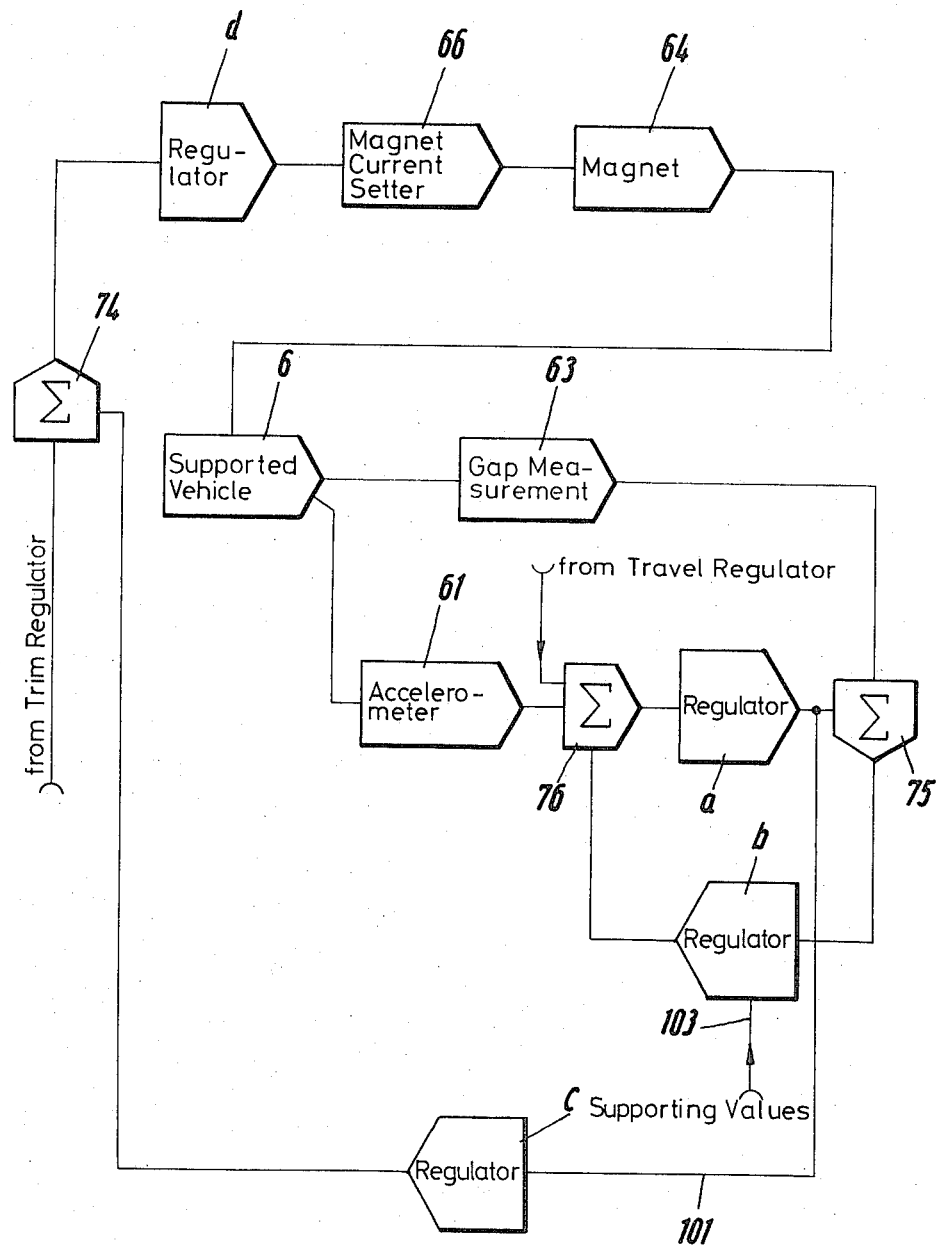
FIG. 2 is a block diagram in the form of a flow chart for the looped control system for supporting and guiding a suspended vehicle.

In order to facilitate the understanding of the invention, FIG. 2 shows a main control circuit 69 illustrating the regulation of a single magnet, which is either a supporting magnet or a guiding magnet. Each main regulator comprises two pairs of regulators $a, b$ and $c, d$, a pair of pickups, namely an accelerometer 61 and a gap measuring instrument 63, a magnetic current-setting means 66 controlling a supporting or guide magnet 64, as well as summation elements 74, 75 and 76. Summation element 74 links the signal from the output of regulator $c$ and the signals from trimming regulator 67, summation element 75 links the gap width signals with the signals supplied from the regulator, and summation element 76 links the signals supplied from regulator $b$ with the accelerometer signals.

Of the two pairs of regulators forming the interlinked control circuits, the regulator pair $a$ and $b$ has the function of forming a directrix from the measuring values of the accelerometers and the gap measuring instruments, and along which directrix the center of gravity S of the suspended vehicle 6 is to be guided. The regulator pair $c$ and $d$ has the function of maintaining the stability of the suspended vehicle in all possible operating conditions, and to ensure riding comfort. Regulators $a$ and $b$ thus form supporting circuits for the lateral and vertical regulation of the suspended vehicle.

Before describing the operation of the invention in detail, reference will be made to prior art publications showing, in detail, certain features of the invention which have been represented in block form in the drawings. In the first place, the general representation of the invention, as shown, for example, in FIGS. 1a, 1b and 2, conforms to the basic block diagram and symbols as approved by the AIEE feedback control systems committee, in a report in "Electrical Engineering," 70, 905-909 (1951), and shown in "Analytical Design of Linear Feedback Controls," published in 1957, by G. C. Newton, L. A. Gould, and J. F. Kaiser. An accelerometer equivalent to the accelerometer 61 is shown in "Control Engineers Handbook," by John G. Truxal, McGraw Hill, 1958, Chapter 17.9, pages 17.37 and 17.38, with particular reference to FIG. 17.34 and the associated description on page 17.38. A gap measuring pick-up, such as the pick-up 63, is shown in the "Control Engineers Handbook" on page 17–16 and in FIG. 17.11, page 17–16 carrying a description of FIG. 17.11. An equivalent gap measuring pick-up is also shown in "Control System Components" by Gibson & Tuteur, published by McGraw Hill in 1958, particular reference being made to page 245 containing FIG. 5.23 and associated description. This literature reference also shows, on page 139, a Thyratron amplifier which can be used as the magnet current setter 66.

"Electronic Analog and Hybrid Computers," by G. A. Korn and T. M. Korn, published by McGraw Hill in 1964, shows, on page 335 and in FIGS. 8 – 23 a and 8 – 23 b, the circuit of an adaptive trim regulator 67. The travel control regulator 70 is the equivalent of means providing a control reference signal and, in the present instance, this control reference signal is a signal representative of the measured air gap. With reference to coupling matrix 72, attention is directed to the already mentioned "Control Engineers Handbook" page 5–20 showing FIG. 5.13 with particular reference to the first and third illustrations in FIG. 5.13. These are illustrations of combinations of multiplications by constant coefficients.

The regulator $b$ and $c$ of FIG. 2 are electrical networks, of which examples are shown in "Control Engineers Handbook" on pages 6 – 34, 6 – 35 and 6 – 36, with particular reference to table 6.3 and with particular reference to the networks 15 to 25 shown in this table. The regulator $d$ is shown in the same publication on page 5 – 19 in table 5.12 the top line entitled "Summation, multiplication by constant coefficients with sine change." This also illustrates the equivalent of ths summing elements 74, 75 and 76 of FIG. 2. The second line of this mentioned table 5.12 illustrates the regulator $a$ with reference to double integration. Additional reference is made to page 5 – 29, FIG. 5.20 a and 5.20 b, of "Control Engineers Handbook."

The method of operation of the above-described arrangement will now be set forth. After the system is switched on, the supporting and guiding magnets, 18, 19 and 20, 21, forming the magnet group 64, are energized through travel regulator 70 and suspended vehicle 6, together with sliding blocks 8 and 9, is lifted from rails 28, 29 and 30, 31 in accordance with a preset program. The gap-measuring means report, to the travel regulator 70 through a line connection 100, the values determined by these measuring means. If all the air gaps are within the given tolerances, linear motor 42 is energized for starting. With the start of the suspended vehicle, accelerometers 61 respond and report their values to the regulators $a$ and $b$. Here a reference line is formed from the accelerometer signals, for example, by double integration, and whose values are compared with the values in regulator $b$ as determined from the gap measurements by ascertaining the mean value.

The output signals, representing the directrix, are supplied over a line connection 101 to regulator $c$, which is designed, for example, as an electrical network and which further processes the signal supplied to it. The output signals of regulator $c$ are supplied, as directrix signals, through summation element 74 to regulator $d$, which generates the setting signal proper to be supplied to the magnetic current setting means, by taking into consideration nominal values superimposed through summation element 74 as commanded by trimming regulator 67, or commanded mean gap width, for example, by superordinated travel regulator 70.

In other words, for the formation of the directrix serving as a nominal value for the main regulator, namely the regulator $d$ of FIG. 2, there are formed differential values from the respective mean values of the twice integrated accelerometer signals and of the respective mean values of the gap measurements (actual values), which are transmitted by the summation element 74 to the respective magnetic current setting means 66 after superimposition of additional control parameters in regulator $c$ and of superordinated parameters from trimming regulator 67, particularly the desired gap width.

Since the suspended vehicle must be guided both vertically and laterally, at least two such directrices must be formed in the above-described manner, and these are combined through the coupling matrix 72.

Additional supporting values can be supplied through a line 103 to regulator $b$, and these are tapped through scanning device 49 from the storages 48 along the roadbed. Naturally, supporting values stored, for scanning, in long-term storages inside the suspended vehicle can also be supplied over line 103 to regulator $b$.

Instead of exactly or substantially exactly integrating parts, it is also possible to use digital filters (estimation filters) for determining the above-mentioned variables of state.

The above-described control circuits, particularly regulators 67 and 70, can have digital computer units as control devices, and which are supplied both from the above-mentioned storages and from the pickups.

If suspension frame 11, or supporting and guiding magnels 18 – 21, are connected elastically with the body 10 of the suspended vehicle 6, the spring characteristic must be so selected that it represents a high pass for long-wave disturbances of the control circuit. The spring parts, which have not been shown, can be active or passive but, in any case, they must be designed as parts of an additional control circuit which is looped or coordinated with the above-described main control circuits.

While a specific embodiment of invention has been shown and described in detail to illustrate the application of the principles of the invention, it will be understood that the invention may be embodied otherwise without departing from such principles.

What is claimed is:

1. In a method for the dynamic uncoupling of a rail-guided vehicle from its guiding rail means, by means of control circuits including measuring elements determining the instantaneously detectable distance between the guide means of the vehicle and its guiding rail means, and determining the acceleration of the vehicle, the improvement comprising supplying vehicle acceleration signals to a control circuit to form a directrix for the vehicle travel path; superposing the distance determination signals on the acceleration signals in the control circuit to cause the directrix to maintain a preselected means position relative to the guiding rail means; and utilizing the directrix to supply signals, through another control circuit, to the vehicle guide means to maintain the center of gravity of the vehicle at a constant distance from the directrix.

2. In a method for the dynamic uncoupling of a rail-guided vehicle from its guiding rail means, the improvement claimed in claim 1, in which the vehicle is magnetically supported on its guiding rail means and is guided, by means of control circuits, to maintain a spacing of its guiding means from the guiding rail means, with the measuring elements determining the magnitude of the spacing and the acceleration of the vehicle.

3. In a method for the dynamic uncoupling of a rail-guided vehicle from its guiding rail means, the improvement claimed in claim 1, comprising supplying typical properties of a roadbed, supporting the guiding rail means, as supporting values in the formation of the directrix for the vehicle travel path.

4. In a method for the dynamic uncoupling of a rail-guided vehicle from its guiding rail means, the improvement claimed in claim 1, including forming respective separate directrices for the vertical and horizontal movements of the vehicle; and combining the separate directrices to form a resultant directrix in a coupling matrix for regulating the locus of the center of gravity of the vehicle along the vehicle travel path.

5. In a method for the dynamic uncoupling of a rail-guided vehicle from its guiding rail means, on which it is magnetically supported, the improvement claimed in claim 2, including combining the signals supplied from the directrix, in a trimming regulator, with additional signals proportional to the magnitude of the spacing of the vehicle guide means from its guide rail means, to the magnitude of the vehicle load, to the magnitude of the external forces acting on the vehicle, to the traveling speed, and to other travel factors; and superimposing output signals of the trimming regulator, as a nominal value, on a regulator controlling the locus of the center of gravity of the magnetically supported vehicle along the vehicle travel path.

6. In apparatus for the dynamic uncoupling of a magnetically supported rail-guided vehicle from its guiding and supporting rail means, of the type including control circuits, for the vertical and horizontal relative positions of the vehicle and regulating the intensity of the exciting current of supporting and guiding magnets constituting the supporting and guiding means of the vehicle, the improvement comprising, in combination, a regulator cascade including three self-contained control circuits; each control circuit including a main regulator to which are supplied acceleration signals and diastimeter signals, representing the distance between the vehicle guide means and the guiding rail means; a coupling matrix connected to the output of said main regulator and combining the signals of the vertical and horizontal control circuits to form a resultant directrix for the vehicle travel path; energizing current adjusting means, controlling the current supplied to the supporting and guiding magnets, connected to said coupling matrix; a trimming regulator superposed on said main regulator and introducing to said main regulator and to said coupling matrix additional parameters including the desired magnitude of the distance between said vehicle guide means and said guiding rail means, the load of the vehicle, external forces acting on the vehicle, the speed of travel of the vehicle, and other parameters; and a travel control circuit in superimposed relation to said main regulator and said trimming regulator.

7. In apparatus for the dynamic uncoupling of a rail-guided vehicle from its guiding rail means, the improvement claimed in claim 6, in which said main regulator comprises two sub-regulators interconnected with each other through summation members; an accelerometer; a distance-measuring element; and a third sub-regulator connected to said first-mentioned two sub-regulators and to said accelerometer and distance-measuring element, and having an output connected, through a further summation member to a vertical and lateral regulator forming part of the control circuit.

8. In apparatus for the dynamic uncoupling of a rail-guided vehicle from its guiding rail means, the improvement claimed in claim 7, including a line supplying additional supporting values to one of said first-mentioned two sub-regulators.

9. In apparatus for the dynamic uncoupling of a rail-guided vehicle from its guiding rail means, the improvement claimed in claim 6, in which said trimming regulator and said travel control circuit include digital computer units as control devices; and storages, containing supporting values, and pickups, supplying inputs to said trimming regulator and said travel control circuit.

10. In apparatus for the dynamic uncoupling of a rail-guided vehicle from its guiding rail means, the improvement claimed in claim 9, in which said storages are arranged both on supporting gear for the rail-guided vehicle and on the roadbed supporting the guiding rail means.

11. In apparatus for the dynamic uncoupling of a rail-guided vehicle from its guiding rail means, the improvement claimed in claim 6, including spring means connecting the supporting and guide magnets to supporting gear for the rail-guided vehicle; said spring means having a spring characteristic representing a high pass for long-wave disturbances of said main regulator.

12. In apparatus for the dynamic uncoupling of a rail-guided vehicle from its guiding rail means, the improvement claimed in claim 11, in which said spring means form parts of control circuit interconnected with said main regulator.

* * * * *